United States Patent
Barrios et al.

(10) Patent No.: US 10,151,289 B2
(45) Date of Patent: Dec. 11, 2018

(54) VEHICLE REMOTE START SYSTEM WITH IGNITION SWITCH WIRE LEARNING AND RELATED METHODS

(71) Applicant: Omega Research And Development Technologies, LLC, Hauppauge, NY (US)

(72) Inventors: Hircio Javier Barrios, Miami, FL (US); Michael Stephen Thompson, Lithia Springs, GA (US)

(73) Assignee: OMEGA RESEARCH AND DEVELOPMENT TECHNOLOGIES, LLC, Hauppauge, NY (US)

( * ) Notice: Subject to any disclaimer, the term of this patent is extended or adjusted under 35 U.S.C. 154(b) by 185 days.

(21) Appl. No.: 15/334,622

(22) Filed: Oct. 26, 2016

(65) Prior Publication Data
US 2018/0112642 A1    Apr. 26, 2018

(51) Int. Cl.
*F02N 11/08* (2006.01)
*F02N 11/12* (2006.01)
*B60R 25/045* (2013.01)

(52) U.S. Cl.
CPC ........ *F02N 11/0807* (2013.01); *B60R 25/045* (2013.01); *F02N 11/12* (2013.01)

(58) Field of Classification Search
CPC ..... F02N 11/0807; F02N 11/12; B60R 25/045
See application file for complete search history.

(56) References Cited

U.S. PATENT DOCUMENTS

| 6,480,098 B2 * | 11/2002 | Flick | B60R 25/04 307/10.2 |
| 6,684,152 B2 * | 1/2004 | Baeuerle | B60T 17/221 701/114 |
| 8,249,759 B2 * | 8/2012 | Lazzara | B60R 25/045 180/287 |

(Continued)

FOREIGN PATENT DOCUMENTS

| EP | 1648054 A2 * | 4/2006 | ......... B60R 16/0215 |
| JP | 2016213634 A * | 12/2016 | ............. H04L 12/28 |

OTHER PUBLICATIONS

Prestige™ APS422E one-way remote start system from Voxx Electronics Corporation: http://www.voxxelectronics.com/prestige/security/?sku=APS422E: retrieved from internet Oct. 25, 2016: pp. 2.

*Primary Examiner* — David Hamaoui
(74) *Attorney, Agent, or Firm* — Allen, Dyer, Doppelt, + Gilchrist, P.A. Attorneys at Law

(57) ABSTRACT

A remote start system is for a vehicle including an ignition switch sequentially movable to a plurality of switch positions, and a plurality of ignition switch wires coupled to the ignition switch. The remote start system may include a wiring harness having a plurality of remote start wires to be arbitrarily coupled to the plurality of ignition wires, a wireless receiver responsive to a wireless remote start signal, and a controller coupled to the wiring harness and the wireless receiver. The controller may, in a learning mode, perform a mapping of the remote start wires to the ignition wires based upon sequential movement of the ignition switch to the plurality of switch positions. The controller may, in an operating mode, selectively activate the remote start wires based upon the mapping to remote start an engine of the vehicle responsive to the wireless receiver.

22 Claims, 5 Drawing Sheets

(56) References Cited

U.S. PATENT DOCUMENTS

| | | |
|---|---|---|
| 8,280,616 B2 | 10/2012 | Barta |
| 2015/0308998 A1* | 10/2015 | Suzuki ................ B60L 11/1881 73/31.05 |
| 2016/0245144 A1* | 8/2016 | Selberg ................... F01N 9/007 |

* cited by examiner

|  | START2w (40A) | START1w (40A) | IGN2w (40A) | IGN1w (20A) | ACCw (20A) |
|---|---|---|---|---|---|
| ACC | -- | -- | -- | +12V | +12V |
| LOCK | -- | -- | -- | -- | -- |
| OFF | -- | -- | -- | -- | -- |
| ON | -- | +12V | +12V | +12V | +12V |
| START | +12V | +12V | -- | +12V | -- |
| ON | -- | +12V | +12V | +12V | +12V |

FIG. 3

VEHICLE REMOTE START SYSTEM WITH IGNITION SWITCH WIRE LEARNING AND RELATED METHODS

TECHNICAL FIELD

This disclosure relates to vehicle control systems and, more particularly, to vehicle remote start systems and related methods.

BACKGROUND

Remote start systems are used to perform remote starting of a vehicle, such as from within a user's home or office. Remote starting an engine allows the vehicle's climate control to be operated to either heat the vehicle on a cold day, or cool the vehicle on a hot day, before the user enters the vehicle. Remote start systems may be installed at the factory when a vehicle is new, or as an aftermarket unit. One example aftermarket remote start system is the Prestige™ APS422E one-way remote start system from Voxx Electronics Corporation of Orlando, Fla. This system includes a control module that is connected to the ignition switch within the vehicle, along with remote control transmitters. The control module initiates a remote start sequence responsive to wireless signals from the remote control device.

Generally speaking, to start the engine of most motor vehicles, the ignition switch is designed to power multiple ignition switch wires in a particular sequence. The timing of this sequence varies based on the vehicle design. Aftermarket remote start systems mimic the ignition switch timing sequence to correctly start the engine. Since the number of ignition switch wires and the remote start power sequence varies from vehicle to vehicle, the remote start needs to be programmed/configured to match. This leaves a vulnerability to human error since the installer has to correctly identify each of the ignition switch wires and configure the remote start to match. Not only does this add time to the installation process, it may be challenging in many installations as well. More particularly, the control module is typically installed underneath the dashboard and connected to ignition switch wires at the bottom of the steering column, which can be difficult to access and make correctly identifying the particular ignition wires problematic.

As such, further enhancements may be desirable with respect to vehicle remote start systems and methods for more easily and reliably installing such systems.

SUMMARY

A remote start system is for a vehicle including an ignition switch sequentially movable to a plurality of switch positions, and a plurality of ignition switch wires coupled to the ignition switch. The remote start system may include a wiring harness having a plurality of remote start wires to be arbitrarily coupled to the plurality of ignition wires, a wireless receiver responsive to a wireless remote start signal, and a controller coupled to the wiring harness and the wireless receiver. The controller may, in a learning mode, perform a mapping of the remote start wires to the ignition wires based upon sequential movement of the ignition switch to the plurality of switch positions. The controller may, in an operating mode, selectively activate the remote start wires based upon the mapping to remote start an engine of the vehicle responsive to the wireless receiver. Since the remote start system is able to be installed with arbitrary connection to the ignition wires, installation time may be significantly reduced. Moreover, wiring mistakes during installation also may be significantly reduced.

The controller may be configured to sense a voltage on each of the plurality of remote start wires when in the learning mode. In addition, the controller may also be configured to supply a battery voltage on selected ones of the plurality of remote start wires in a remote start sequence when in the operating mode.

The controller may comprise a processor and a plurality of associated switches coupled between the battery voltage and the selected ones of the plurality of remote start wires. A remote start housing may carry the wireless receiver and the controller. In addition, a first connector may be carried by the remote start housing, and the wiring harness may comprise a second connector mateable with the first connector and coupled to the remote start wires.

The plurality of switch positions of the ignition switch may comprise an off position, a run (or on) position, and a start position. Accordingly, the controller may selectively activate the plurality of remote start wires to simulate a sequence of movement from the off position, through the run position, to the start position, and back to the run position defining a remote start sequence. Of course, the plurality of switch positions of the ignition switch may further comprise an accessory position. The system may also include a remote start transmitter configured to transmit the wireless remote start signal to the wireless receiver to remote start the engine of the vehicle.

A method aspect is for installing a remote start system for a vehicle including an ignition switch sequentially movable to a plurality of switch positions, and a plurality of ignition switch wires coupled to the ignition switch. The method may include arbitrarily coupling a wiring harness of the remote start system comprising a plurality of remote start wires to the plurality of ignition switch wires. The method may also include operating a controller of the remote start system coupled to the wiring harness and a wireless receiver to, in a learning mode, perform a mapping of the plurality of remote start wires to the plurality of ignition switch wires based upon sequential movement of the ignition switch to the plurality of switch positions. Thus, in an operating mode, the controller may selectively activate the plurality of remote start wires based upon the mapping to remote start an engine of the vehicle responsive to the wireless receiver.

BRIEF DESCRIPTION OF THE DRAWINGS

FIG. 3 is a table illustrating the voltages present on respective ignition switch wires as the ignition switch of FIG. 2 is rotated through its switch positions.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notion is used to indicate similar elements in different embodiments.

Figure 1:
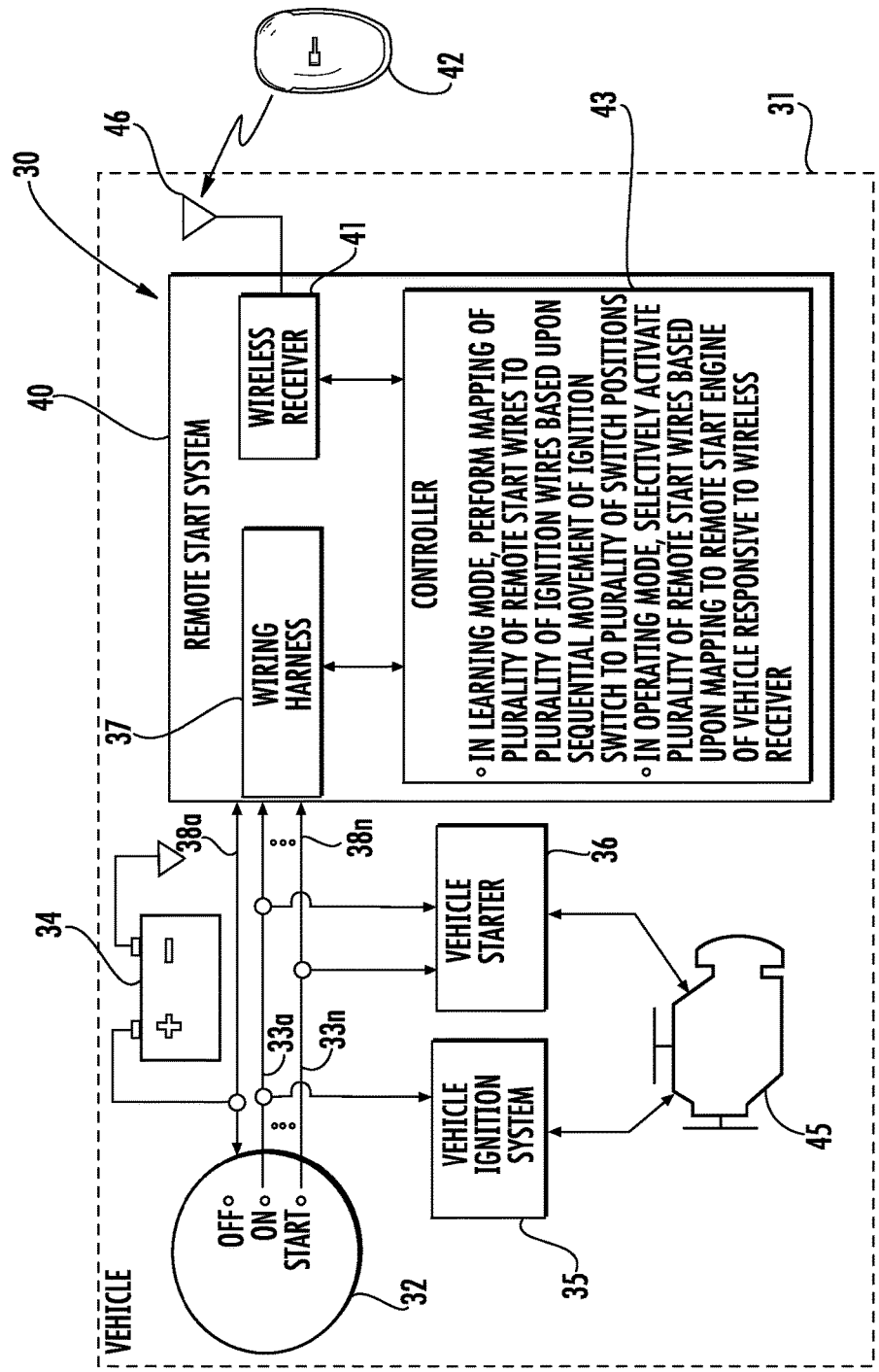
FIG. 1 is a schematic block diagram of a remote start system for a vehicle in accordance with an example embodiment.

Referring initially to FIG. 1, a remote start system 30 is for a vehicle 31 illustratively including an ignition switch 32 that is sequentially movable to a plurality of switch positions. In this illustrated example, the ignition switch 32 is movable between OFF, ON, and START positions, but other switch positions may be provided in different embodiments, as will be discussed further below. A plurality of ignition switch wires 33a-33n are also illustratively coupled to the ignition switch 32, which are used to convey power from a vehicle battery 34 to a vehicle ignition system 35 and a vehicle starter 36, as well as other vehicle components, as the ignition switch is rotated to the ON and START positions to start an engine 45 of the vehicle 31.

The remote start system 30 illustratively includes a housing 40, a wireless receiver 41 carried by the housing and responsive to a wireless remote start signal received via an antenna 46 from a wireless transmitter(s) 42, and a controller 43 carried by the housing. The system 30 further illustratively includes a wiring harness 37 carried by the housing 30 and coupled to the controller 43. The wiring harness 37 illustratively includes a plurality of remote start wires 38a, 38b to be arbitrarily coupled to the ignition switch wires 33a-33n. In the illustrated example, the wireless transmitter 42 is a fob, but in other embodiments different types of wireless devices (e.g., a smartphone, tablet computer, etc.) may be used to transmit control signals to the controller 43.

On conventional remote start systems, there are three common circuit switches. The first is the IGNITION circuit, which is powered with the ignition key is in the RUN/ON position. This circuit stays on when the key is moved to the START position, and continues to stay on until the key is turned off to shut down the engine. The second circuit is an ACCESSORY circuit, which is powered when the ignition key is in the ACCESSORY and RUN/ON positions. Since it is not required for starting the engine 45 and typically powers only accessory items, it powers off when the key is in the START position to provide full power to the starter 36. Furthermore, a START circuit is powered only when the ignition key is in the START position to supply power to the starter 36. However, it should be noted that there may be multiples of any of these circuit types in a given vehicle, and there are other variations of these circuits which are less common, and the embodiments described herein may be used with these different configurations.

In such conventional remote start systems, the IGNITION, ACCESSORY, and START circuits are outputs only (with respect to remote start operation) and require manual configuration. In addition to potential error during manual configuration, it may also be difficult to access the ignition switch wires 33a-33n during the installation process, as described above, and as such it may be problematic for an installer to always match the appropriate remote start wire 38a-38n to its corresponding ignition switch wire.

To help reduce such errors, the remote start system 30 may advantageously not only provide the requisite outputs to mimic the ignition switch sequence 32 to perform remote starting, but it may also be switchable to a learning mode to receive the sequence of voltages presented on the ignition switch wires 33a-33n during a key start operation and automatically determine how the remote start wires 38a-38n have been connected, and thereby configure itself to perform a remote start operation for the given vehicle 31.

Figure 5:
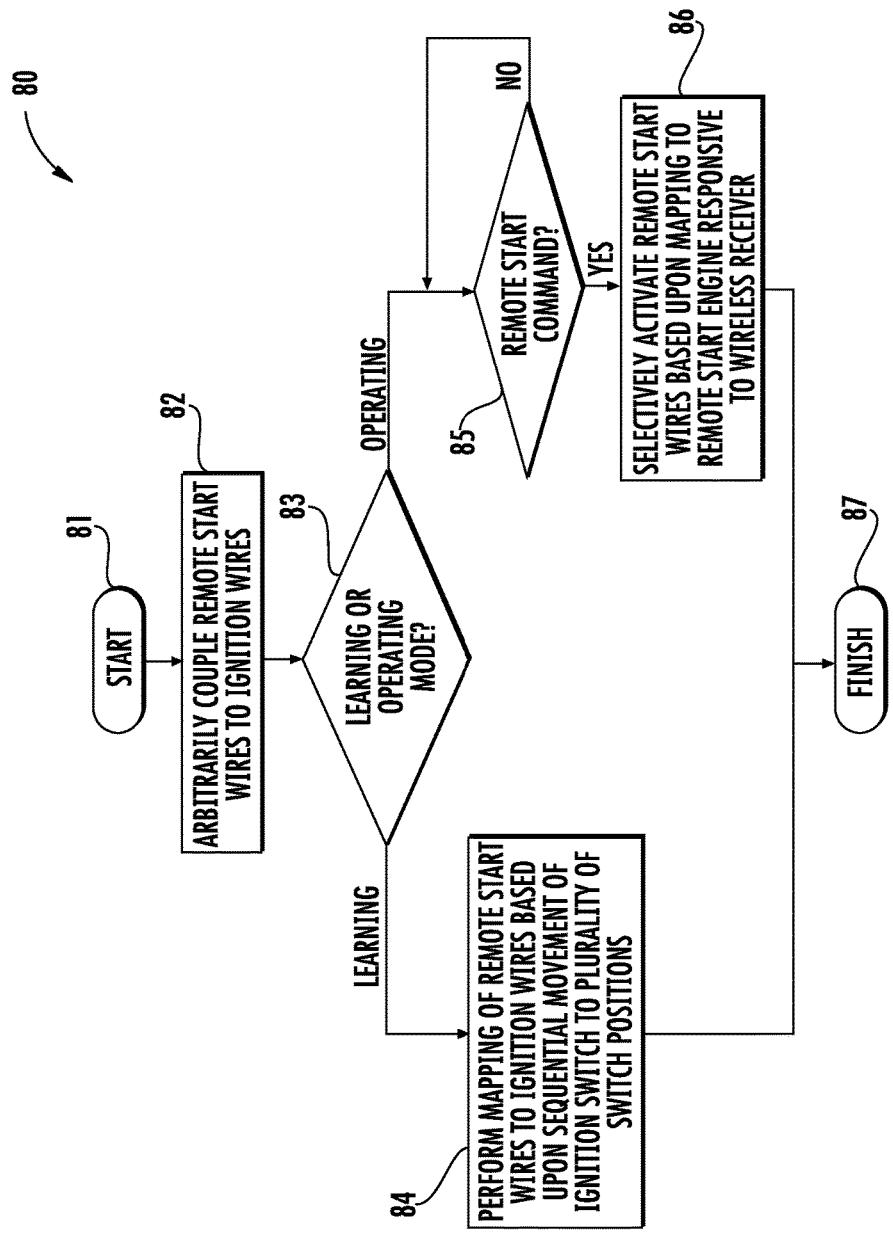
FIG. 5 is a flow diagram illustrating method aspects associated with the system of FIG. 1.

Referring additionally to the flow diagram 80 of FIG. 5, beginning at Block 81, the installer arbitrarily couples the remote start wires 38a-38n to the ignition switch wires 33a-33n, at Block 82. The remote start system 30 is also coupled to the vehicle power system, shown schematically in FIG. 1 with a connection to the battery 34. Furthermore, the controller 43 enters a learning mode (Block 83) in which it performs a mapping of the remote start wires 38a-38n to the ignition switch wires 33a-33n based upon sequential movement of the ignition switch to the plurality of switch positions, at Block 84.

By way of example, the remote start system 30 may include a switch (e.g., a button) which may be used by an installer to switch the controller 43 between the learning mode and a normal operating mode, although other suitable approaches for switching between the two modes may also be used (e.g., a USB or other communications port to connect with a computing device, etc.). Since the remote start system 30 is able to be installed with arbitrary connection to the ignition switch wires 33a-33n, installation time may be significantly reduced. Moreover, wiring and/or configuration mistakes during installation may also be significantly reduced or eliminated.

Once switched to the operating mode, the controller 43 selectively activates the remote start wires 38a-38n based upon the mapping to remote start the engine 45 of the vehicle 31 responsive to the wireless receiver 41 receiving a remote start command from the wireless transmitter 42. That is, the controller 43 in the operating mode outputs power from the battery 34 to the remote start wires 38a-38n (and, accordingly, the vehicle ignition system 35 and the vehicle starter 36) in the same learned sequence that power is applied to the ignition switch wires 33a-33n during an ignition switch rotation to thereby remote start the vehicle 31.

Figure 2:
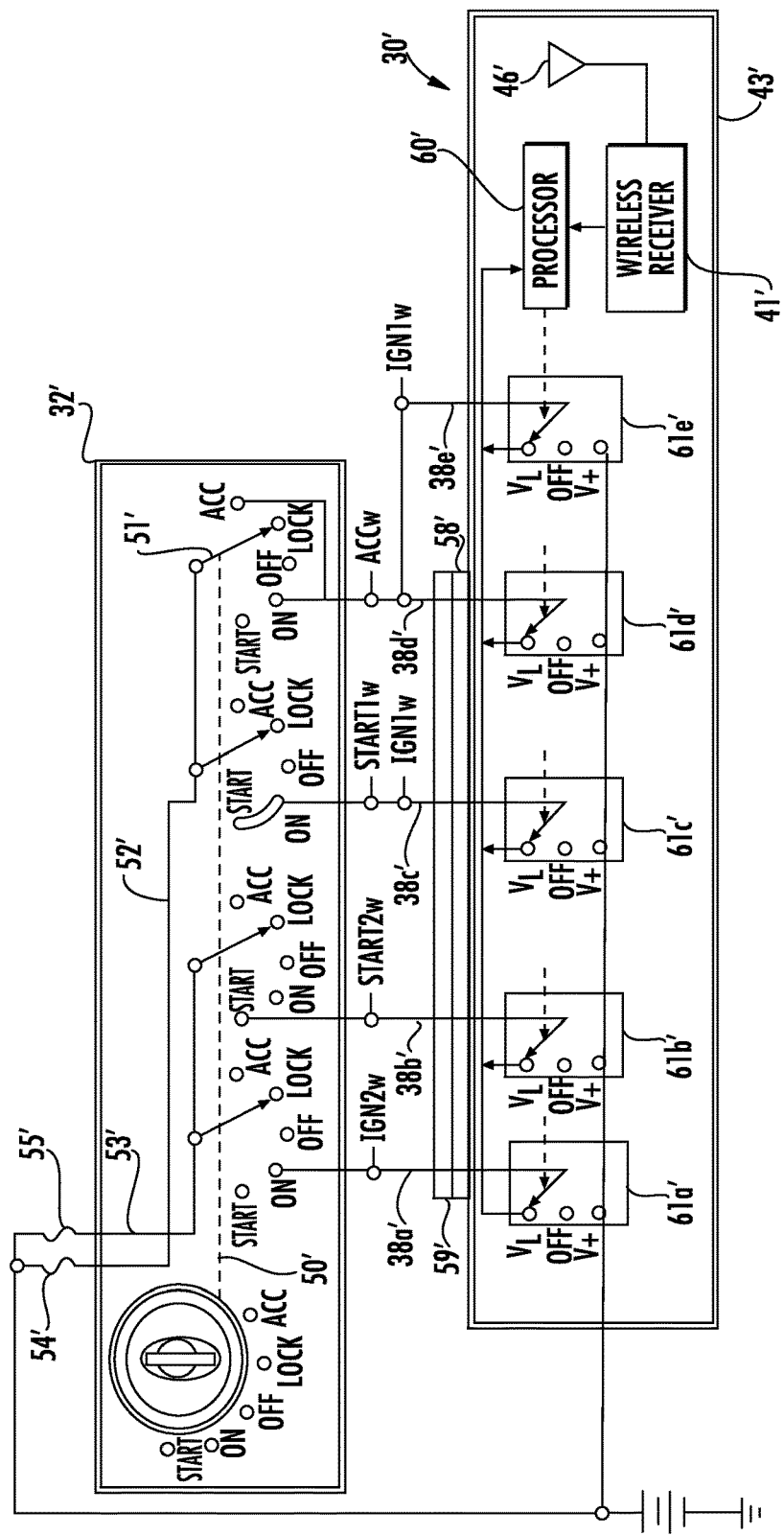
FIG. 2 is a schematic block diagram of another example embodiment of the system of FIG. 1.
Figure 4:
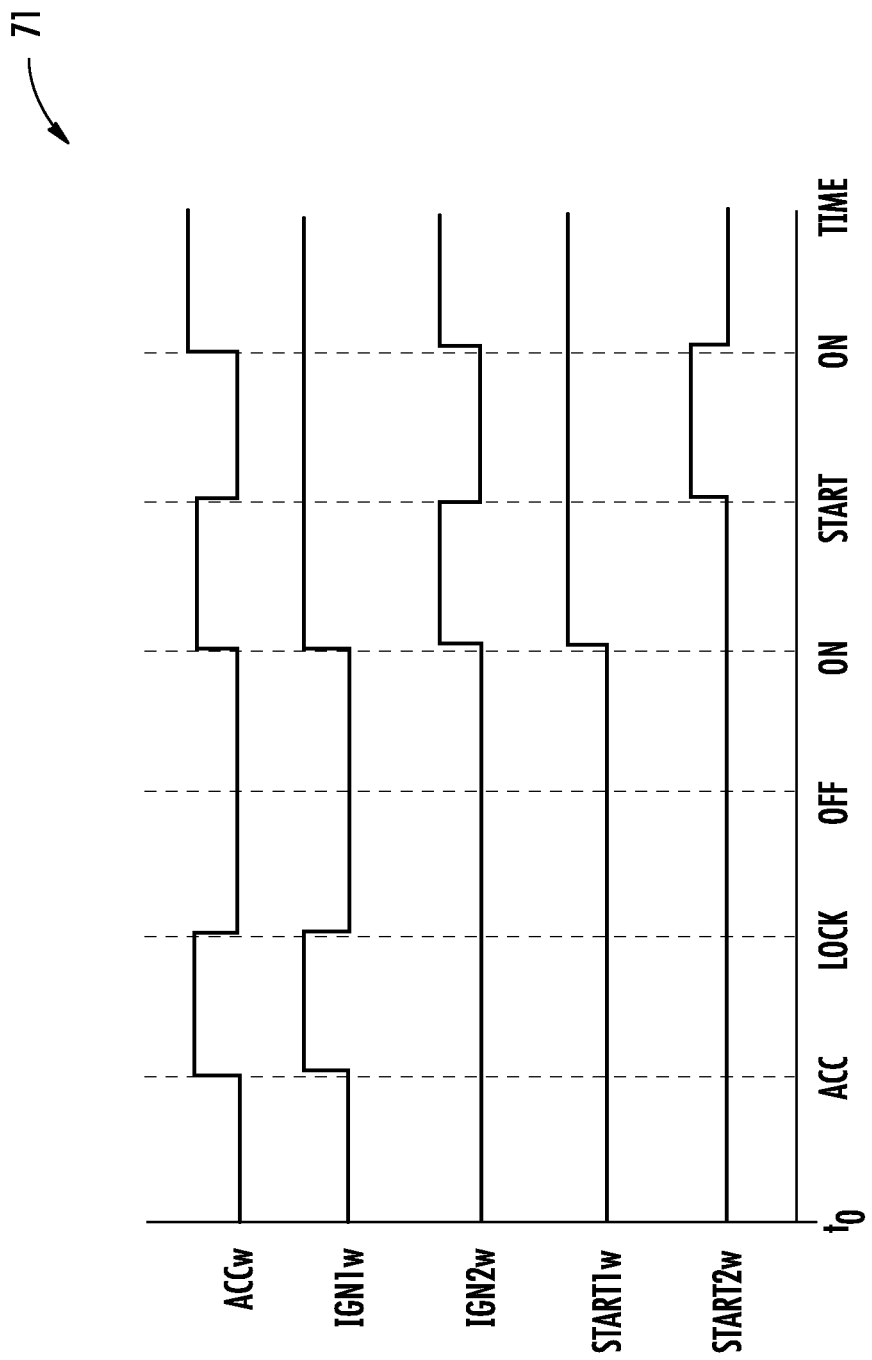
FIG. 4 is a timing diagram illustrating the voltages present on respective ignition switch wires as the ignition switch of FIG. 2 is rotated through its switch positions.

The foregoing will be further understood with reference to an example implementation set forth in FIGS. 2-4. Here the ignition switch 32' further includes an accessory (ACC) switch position, in addition to a LOCK (or off) position, an ON (or run) position, and a START position as shown. The dashed line 50' and arrows 51' in the ignition switch 32' in FIG. 2 show which of the ignition switch wires ACCw (accessory wire) IGN1w (first ignition wire), IGN2w (second ignition wire) START1w (first starter wire), and START2w (second starter wire) receive power (e.g., +12V) from the vehicle battery 34' when the ignition switch is in each of the different switch positions. More particularly, in the present embodiment two 12V power wires 52', 53' are coupled from the battery 34' to the ignition switch 32' via respective fuses 54', 55'. In the present example, the fuse 54' is a 20 A fuse, while the fuse 55' is a 40 A fuse (although other fuses may be used in different embodiments). This allows vehicle accessories (e.g., stereo, interior lights, etc.) to be supplied with power at the lower current rating, while reserving the higher current supply for engine starting operations where larger current draw occurs. However, it should be noted that separately fused power wires need not be used in all embodiments (i.e., a single power wire could be used).

In the illustrated example, a first connector 58' may be carried by the remote start housing 43', and the wiring harness may include a second connector 59' mateable with the first connector and coupled to the remote start wires 38a'-38e'. Moreover, in the illustrated example the controller illustratively includes a processor 60' (e.g., a microprocessor) and a plurality of associated switches or circuits 61a'-61e'. More particularly, the switches 61a'-61e' function as input/output (I/O) circuits so that when the processor 60 is in the learning mode, these circuits are switched to a voltage learning position ($V_L$) to detect when voltages are applied to the ignition switch wires ACCw, IGN1w, IGN2w, START1w, and START2w during the starting sequence. Furthermore, when in the operating mode and a remote start signal is received by the processor 60', it may then selectively operate the switches between an off position (OFF) and an output power position (V+) to thereby output power to the ignition switch wires ACCw, IGN1w, IGN2w, START1w, and START2w in the same sequence that power is applied to these wires during the actual ignition switch 32' starting sequence.

An example starting sequence which a technician may use to configure the remote start system 30' is shown in table 70 of FIG. 3 and the timing diagram 71 of FIG. 4. Here, when the processor 60' is in the learning mode, the technician sequentially switches the ignition switch 32' to the following positions in order: ACC, LOCK, OFF, ON, START and ON. The rows in the table 70 are arranged in this sequence from top to bottom. More particularly, at time $t_0$ no power is supplied from the battery 34' to any of the ignition switch wires. In the ACC position, the ignition switch wires ACCw and IGN1w receive +12V, while in the LOCK and OFF positions no power is supplied to any of the ignition switch wires. As the switch 32' reaches the ON position, the ignition switch wires ACCw, IGN1w, IGN2w and START1w all receive +12V, and when the switch reaches the START position the ignition switch wires IGN1w, START1w and START2w receive power. Once the vehicle starts, the ignition switch 32' is typically spring biased to move it back to the ON position when the user ceases to apply forward pressure, e.g., by letting it go.

As noted above, the ignition switch wires ACCw, IGN1w, IGN2w, START1w and START2w may be arbitrarily connected to the circuits 61a'-61e', but if the technician switches the ignition switch 32' in the order prescribed above then the processor 60' will be able to determine which wire is connected to which circuit. For example, knowing that only the ignition switch wires IGN1w and ACCw receive power in the ACC position, and that the wire ACCw does not receive power in the START position, after reaching the start position the processor 60' it will be determined that the wire ACCw is the accessory wire and connected to the circuit 61d', and the wire IGN1 is the first ignition wire and connected to the circuit 61e'. Moreover, knowing that the wire START2w only receives power when in the start position, it can be identified that this wire is the second starter wire and is connected to the circuit 61b'. Furthermore, since only the wires START1w and IGN2w remain to be assigned, and it is known that the wire IGN2w will be off in the START position, these wires may therefore be identified as the first starter wire and the second ignition system wire and mapped to the circuits 61c' and 61a', respectively. With these mappings saved in a memory (not shown) associated with the processor 60', the processor may accordingly selectively power the appropriate circuits 61a'-61e' in the operating mode to recreate the sequence represented in FIGS. 3 and 4, as will be appreciated by those skilled in the art. That is, the processor 60' may logically deduce which circuit 61a'-61e' is connected to which ignition switch wire ACCw, IGN1w, IGN2w, START1w or START2w, and automatically reconfigure its operation to match the given ignition switch 32' for the particular type of vehicle in which the remote start system 30' is being installed. That is, the processor 60' may selectively activate the circuits 61a'-61e' to thereby power the plurality of remote start wires 38a'-38e' to simulate a mechanical sequence of movement of the ignition switch 32' described above.

It should be noted that the above-described example is but one of many different ignition switch configurations that may be used, as different vehicle manufacturers use different types of ignition switches and different numbers of wires. However, the processor 60' may similarly determine which ignition switch wires are present and to which circuit 61a'-61e' they are connected using the techniques described above. For example, it will be appreciated that the table 70 is a truth table for the given ignition switch circuit 32' and ignition switch wire configuration. Other such truth tables may similarly be used by the processor 60' to determine which ignition switch wires are present in a given vehicle and to which circuits 61a'-61e' they have been connected, as will be appreciated by those skilled in the art. Moreover, different numbers of circuits 61a'-61e' may be provided in different embodiments. It should also be noted that while the above examples are provided with respect to rotatable ignition key switches, the techniques described herein may be used with other types of ignitions switches as well, such as push button switches, as will be appreciated by those skilled in the art.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A remote start system for a vehicle including an ignition switch sequentially movable to a plurality of switch positions, and a plurality of ignition switch wires coupled to the ignition switch, the remote start system comprising:
   a wiring harness comprising a plurality of remote start wires to be arbitrarily coupled to the plurality of ignition switch wires;
   a wireless receiver responsive to a wireless remote start signal; and
   a controller coupled to the wiring harness and the wireless receiver and configured to
      in a learning mode autonomously perform a mapping of the plurality of remote start wires to the plurality of ignition switch wires based upon sequential movement of the ignition switch to the plurality of switch positions, and
      in an operating mode, selectively activate the plurality of remote start wires based upon the mapping to remote start an engine of the vehicle responsive to the wireless receiver.

2. The remote start system of claim 1 wherein the controller is configured to sense a voltage on each of the plurality of remote start wires when in the learning mode.

3. The remote start system of claim 1 wherein the controller is configured to supply a battery voltage on selected ones of the plurality of remote start wires in a remote start sequence when in the operating mode.

4. The remote start system of claim 3 wherein the controller comprises a processor and a plurality of associated switches coupled between the battery voltage and the selected ones of the plurality of remote start wires.

5. The remote start system of claim 1 further comprising a remote start housing carrying the wireless receiver and the controller.

6. The remote start system of claim 5 further comprising a first connector carried by the remote start housing; and wherein the wiring harness comprises a second connector mateable with the first connector and coupled to the plurality of remote start wires.

7. The remote start system of claim 1 wherein the plurality of switch positions of the ignition switch comprises an off position, a run position, and a start position; and wherein the controller selectively activates the plurality of remote start wires to simulate a sequence of movement from the off position, through the run position, to the start position, and back to the run position defining a remote start sequence.

8. The remote start system of claim 1 wherein the plurality of switch positions of the ignition switch comprises an accessory position.

9. The remote start system of claim 1 further comprising a remote start transmitter configured to transmit the wireless remote start signal.

10. A remote start system for a vehicle including an ignition switch sequentially movable to a plurality of switch positions, and a plurality of ignition switch wires coupled to the ignition switch, the remote start system comprising:
a remote start housing;
a wiring harness extending outwardly from the remote start housing and comprising a plurality of remote start wires to be arbitrarily coupled to the plurality of ignition switch wires;
a wireless receiver carried by the remote start housing and responsive to a wireless remote start signal; and
a controller carried by the remote start housing and coupled to the wiring harness and the wireless receiver and configured to
in a learning mode autonomously perform a mapping of the plurality of remote start wires to the plurality of ignition switch wires based upon sequential movement of the ignition switch to the plurality of switch positions, and
in an operating mode, selectively activate the plurality of remote start wires based upon the mapping to remote start an engine of the vehicle responsive to the wireless receiver.

11. The remote start system of claim 10 wherein the controller is configured to sense a voltage on each of the plurality of remote start wires when in the learning mode.

12. The remote start system of claim 10 wherein the controller is configured to supply a battery voltage on selected ones of the plurality of remote start wires in a remote start sequence when in the operating mode.

13. The remote start system of claim 12 wherein the controller comprises a processor and a plurality of associated switches coupled between the battery voltage and the selected ones of the plurality of remote start wires.

14. The remote start system of claim 10 further comprising a remote start housing carrying the wireless receiver and the controller.

15. The remote start system of claim 14 further comprising a first connector carried by the remote start housing; and wherein the wiring harness comprises a second connector mateable with the first connector and coupled to the plurality of remote start wires.

16. The remote start system of claim 10 wherein the plurality of switch positions of the ignition switch comprises an off position, a run position, and a start position; and wherein the controller selectively activates the plurality of remote start wires to simulate a sequence of movement from the off position, through the run position, to the start position, and back to the run position defining a remote start sequence.

17. The remote start system of claim 10 wherein the plurality of switch positions of the ignition switch comprises an accessory position.

18. The remote start system of claim 10 further comprising a remote start transmitter configured to transmit the wireless remote start signal.

19. A method of installing a remote start system for a vehicle including an ignition switch sequentially movable to a plurality of switch positions, and a plurality of ignition switch wires coupled to the ignition switch, the method comprising:
arbitrarily coupling a wiring harness of the remote start system comprising a plurality of remote start wires to the plurality of ignition switch wires; and
operating a controller of the remote start system coupled to the wiring harness and a wireless receiver to, in a learning mode autonomously perform a mapping of the plurality of remote start wires to the plurality of ignition switch wires based upon sequential movement of the ignition switch to the plurality of switch positions, so that, in an operating mode, the plurality of remote start wires are selectively activatable based upon the mapping to remote start an engine of the vehicle responsive to the wireless receiver.

20. The method of claim 19 wherein operating the controller comprises operating the controller to sense a voltage on each of the plurality of remote start wires when in the learning mode.

21. The method of claim 19 wherein the plurality of switch positions of the ignition switch comprises an off position, a run position, and a start position.

22. The method of claim 21 wherein the plurality of switch positions of the ignition switch further comprises an accessory position.

* * * * *